LINEAR/LOG TIME RAMP GENERATOR

Filed Aug. 15, 1967 2 Sheets-Sheet 1

INVENTOR.
THEODORE E. D. WOLK
BY [signature]
ATTORNEY.

INVENTOR.
THEODORE E.D. WOLK
BY J. Donald Nelson Jr.
ATTORNEY.

United States Patent Office 3,521,082
Patented July 21, 1970

3,521,082

LINEAR/LOG TIME RAMP GENERATOR

Theodore E. D. Wolk, Littleton, Colo., assignor to Honeywell Inc., Minneapolis, Minn., a corporation of Delaware Filed Aug. 15, 1967, Ser. No. 660,693
Int. Cl. G06g 7/12, 7/24
U.S. Cl. 307—230 7 Claims

ABSTRACT OF THE DISCLOSURE

A signal generator is provided. The generator produces a ramp signal. The signal generator includes an operational amplifier which is used as an integrator and a selectively connected feedback path wherein linear or log operation is alternately achieved. Suitable controls permit the generator to operate over selected ranges.

Signal generators are known in the art. More particularly, signal generators that provide a linearly varying ramp signal are known. In addition, signal generators that provide a ramp signal which varies logarithmically are known. However, many of these signal generators are extremely complicated and, therefore, extremely expensive. In addition, operation thereof and maintenance thereof is rendered quite difficult and time consuming. In the circuits that are nkown in the art, separate time constant circuits are utilized for the linear and the log ramp signals. In addition, a plurality of critically biased diodes are used to change the linear ramp signal into a log ramp signal. This diode circuitry is difficult and expensive to produce and maintain.

The subject signal generator is a circuit wherein the output signal is a linearly or a logarithmically varying ramp signal. A simple integrating amplifier is selectively connected to a source which provides suitable input signals. Additionally, a feedback path is selectively connected across the amplifier in order to provide the log output signal. In some cases, it is advantageous to selectively vary the operating period of the integrating amplifier. Typical control means may be provided to alter the integrating connection.

It is apparent that one object of this invention is to provide a signal generator.

Another object of this invention is to provide a signal generator selectively providing linearly or logarithmically varying output signals.

Another object of this invention is to provide a signal generator providing a ramp output signal and having a variable operational period.

Another object of this invention is to provide a signal generator which provides controllable output signal ranges.

These and other objects and advantages will become more readily apparent when the following description is read in conjunction with the attached drawings, in which.

Figure 1:
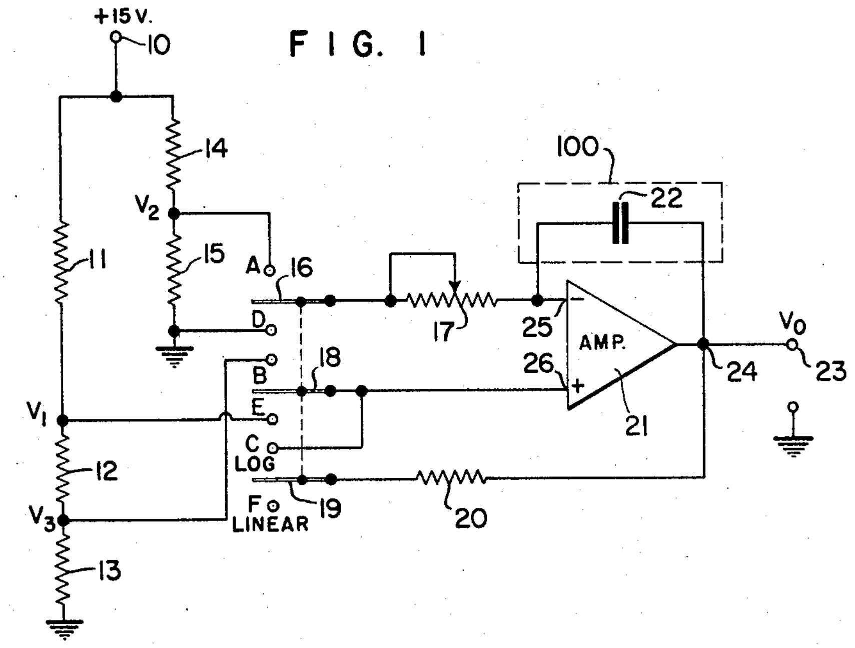
FIG. 1 is a schematic diagram of one embodiment of the invention.

Referring now to FIG. 1, a potential source 10 which may be any suitable substantially constant D-C source (for example +15 volts) which is connected to a voltage divider network comprising resistors 11, 12 and 13. One terminal of resistor 13 is connected to a suitable reference potential, for example ground. Thus, in the embodiments shown, a 15-volt potential appears across the aforesaid voltage divider network. Source 10 is also connected to a further voltage divider network comprising resistors 14 and 15. One terminal of resistor 15 is connected to a suitable reference potential, for example ground, whereby 15 volts appear across the second mentioned voltage divider network.

A plurality of ganged switches 16, 18 and 19 have contacts thereof connected to the aforesaid voltage dividers. Specifically, contacts A and D of switch 16 are connected at separate terminals of resistor 15. Contact D is connected to the ground terminal of resistor 15. Contact A is connected at the junction between resistors 14 and 15 and exhibits a potential $V_2$. Contacts B and E are connected to separate terminals of resistor 12. Contact B is connected to the junction between the terminals of resistors 12 and 13 wherein a potential $V_3$ is exhibited. Contact E is connected at the junction of resistors 11 and 12 whereby a potential $V_1$ is exhibited at contact E.

The armature of switch 18 is connected to the noninverting input 26 of operational amplifier 21. The armature of switch 16 is connected via variable resistor 17 to to the inverting input 25 of amplifier 21. Amplifier 21 is a typical operational amplifier which has high open loop gain and low output impedance. In a preferred embodiment, amplifier 21 may be an integrated circuit which is commercially available. Typically, amplifier 21 exhibits high static input impedance and low dynamic input impedance. The output 24 of amplifier 21 is connected to the output terminal 23. The output signal $V_0$ is obtained at output terminal 23. This output signal is a ramp signal as will be described hereinafter.

An integrating network 100 is connected between the inverting input 25 and the output terminal 24 of amplifier 21. Specifically, capacitor 22 is a typical component for producing an integrating amplifier effect. Capacitor 22 in conjunction with resistor 17 determines the period of integrator operation.

A feedback resistor 20 is connected from the output terminal 24 to the armature of switch 19. The contacts C and F of switch 19 represent the LOG and LINEAR positions of the switch, respectively. Contact C is connected to the noninverting input 26 of amplifier 21 whereby a feedback path exists from the output to the noninverting input when switch 19 is connected to contact C. In this condition, the output signal produced by the circuit is a log ramp. Contrariwise, contact F is unconnected wherein the feedback comprising resistor 20 is broken when switch 19 is connected to contact F. In this condition, a linear ramp signal is produced.

Figure 2:
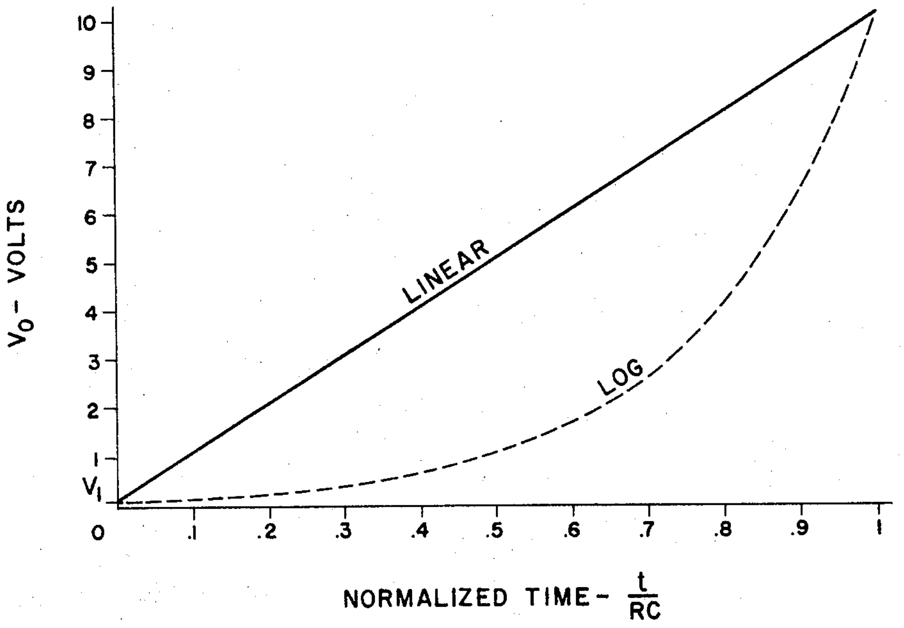
FIG. 2 is a graphic showing of the output signals supplied by the subject signal generator.

Referring now to FIG. 2, there is shown a normalized waveform for linear and log ramp signals, as labelled. These signals are generated by the circuit shown in FIG. 1. The co-ordinate axes of the graph represent VOLTAGE from zero to $V_0$ (ordinate) and T/RC (normalized) from zero to one (abscissa). The voltage $V_0$ is the output signal obtained at output terminal 23. An offset voltage $V_1$ is indicated inasmuch as this is a typical mode of operation. In determining the time duration (T), resistor 17 is variable and provides resistance (R) while capacitor 24 provides the capacitance (C). This graphic showing represents the output signal $V_0$ as a function of time.

In operation, it is initially assumed that the circuit of FIG. 1 is in the linear mode of operation. Consequently, switches 16, 18 and 19 are connected to contacts D, E and F, respectively. Because of the condition of switch 19, the feedback path comprising resistor 20 is open circuited and non-conductive. The potential $V_1$ is supplied via contact E of switch 18 to the noninverting input 26 of amplifier 21. The inverting input 25 of amplifier 21 is connected to ground at contact D of switch 16 via resistor 17.

In this condition, the circuit is a conventional integrator with offset voltage $V_1$ at the noninverting input of operational amplifier 21. There is no current flow in feedback path 20. Feedback current through capacitor 22 equals the current through resistor 17. The output voltage $V_0$ is defined by the equation $V_0=V_1(1+T/RC)$. As noted in reference to FIG. 2, $V_1$ is an offset voltage. R and C are the values of resistor 17 and capacitor 22, respectively. At time period $T=0$, the output voltage, $V_0$, is equal to the offset voltage, $V_1$. As time increases, it is seen in FIG. 2 that the output voltage, $V_0$, also increases linearly. Thus, a conventional integrating amplifier with linear voltage output is provided.

However, when switches 16, 18 and 19 are switched to be connected to contacts A, B and C, respectively, a log mode of operation is provided. That is, the feedback path comprising resistor 20 is connected across amplifier 21 from the output terminal 24 to the noninverting input 26 via contact C of switch 19. The offset voltage $V_3$ replaces offset voltage $V_1$ and is applied via contact B of switch 18 to noninverting input terminal 26 of amplifier 21. Additionally, the voltage input to inverting input 25 of amplifier 21 is $V_2$ instead of ground. That is, voltage $V_2$ is supplied via contact A of switch 16, through resistor 17, to inverting input 25 of amplifier 21.

Thus, in addition to the input voltage at the inverting input of amplifier 21 being altered, the voltage at the noninverting input is changed as well. The voltage applied to input 26 is $V_3+KV_0$. That is, offset voltage $V_3$ is combined with the portion of output voltage $V_0$ which is applied by the feedback resistor 20. In this circuit, K has a value less than one. The value of K is computed from the equation.

$$K=\frac{R1R2}{R1R2+R_F(R1+R2)}$$

where R1 comprises resistor 13; R2 comprises resistors 11 and 12, and $R_F$ comprises resistor 20.

As noted, the voltage supplied at terminal A and, thus, to resistor 17 is $V_2$ instead of 0. Thus, the current flow through resistor 17 is different from the condition in the linear mode. Additionally, a feedback current exists in resistor 20. Consequently, a new expression for the output voltage is derived when the currents involved are summed. The output voltage, in the log mode, becomes $$V_0=\frac{V_3}{1-K}e^x+\frac{V_3-V_2}{K}(e^x-1)$$

where $$x=\frac{KT}{RC(1-K)}$$

Since it is desirable to have the end points of the ramp signal produced by the generator be coextensive in either the linear or log mode of operation, the output voltage expressions are compared. It is noted that in the linear mode, at time $T=0$, the output voltage $V_0$ equals the offset voltage $V_1$. In the log mode at time period $T_0$, the output voltage $V_0$ equals the offset voltage $V_3/1-K$ in order to obtain a similar starting voltage point, $V_3$ and K are adjusted so that $V_1=V_3/(1-K)$. It has been determined that in order to closely match the curve of log 10, a suitable value for $K=0.042$. It should be noted, of course, that this value of the K factor is illustrative only and is not meant to be limitative of the invention.

Thus, it is seen that a relatively simple and uncomplicated signal generator is provided. This signal generator provides a ramp output signal which follows either the log or the linear curve. This circuit is provided through the selective insertion of a feedback path as well as the selective alteration of input voltages to an integrating amplifier.

Figure 3:
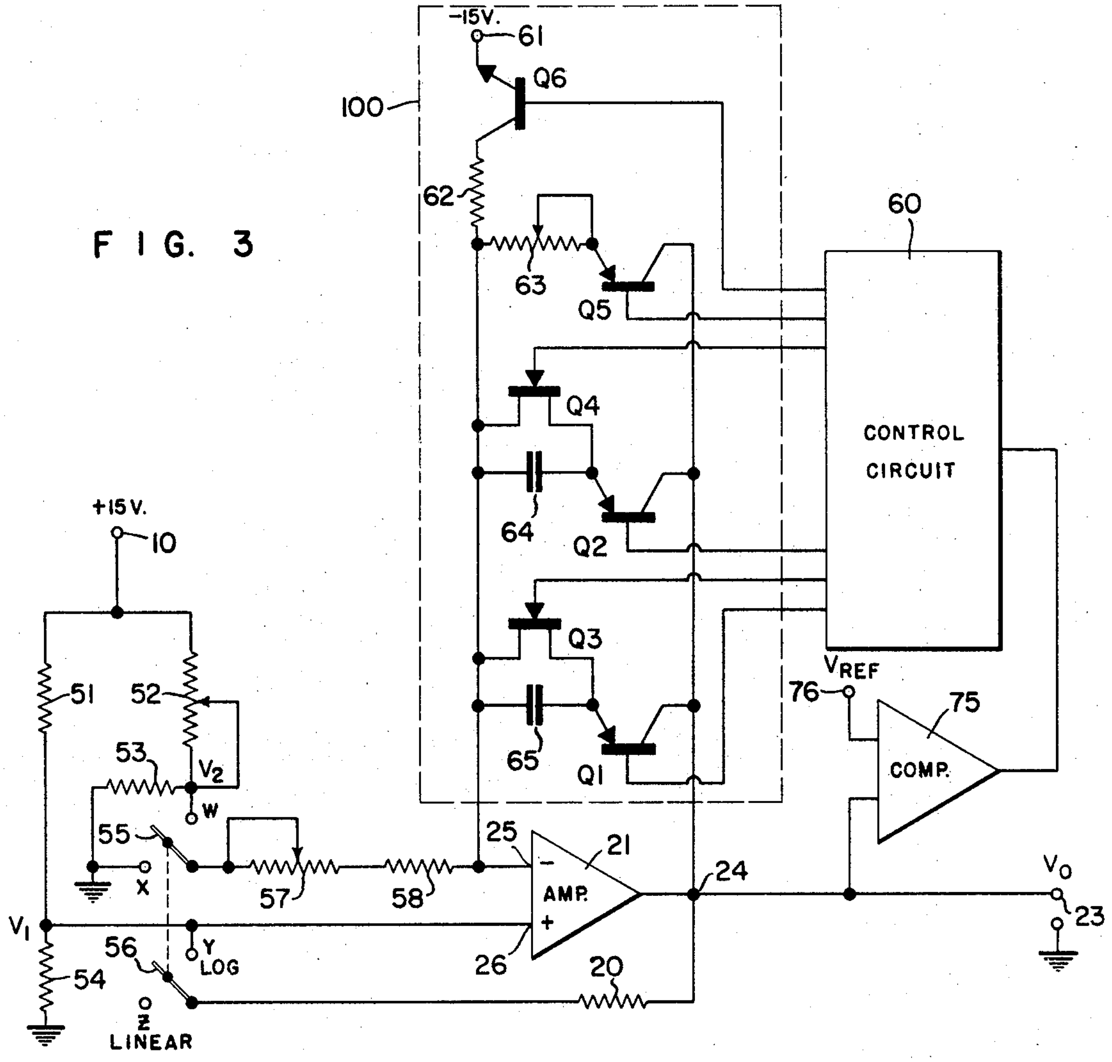
FIG. 3 is a schematic diagram of a second embodiment of the invention.

Referring now to FIG. 3, there is shown another embodiment of the invention. In this figure, components which are similar to those previously mentioned bear similar reference numerals. Thus, a source 10 is connected to a voltage divider comprising resistors 51 and 54. Resistor 54 is connected to ground whereby a 15-volt potential appears across the resistance network. A further voltage divider network comprising resistors 52 and 53 is connected between source 10 and ground. Resistor 52 is a variable resistor whereby adjustment of voltage $V_2$ may be achieved. Switches 55 and 56 are connected to the resistance network. In particular, switch 55 selectively engages contact W which is connected between resistors 52 and 53. Alternatively, switch 55 is connected to contact X which is connected to ground potential. At switch 56, LOG contact Y is connected to the common junction between resistors 51 and 54. Contact Z is unconnected and provides LINEAR connection. The armature of switch 55 is connected via the series connection of variable resistor 57 and resistor 58 to the inverting input 25 of amplifier 21. The noninverting input of amplifier 21 is connected to contact Y of switch 56. The output terminal 24 of amplifier 21 is connected via feedback resistor 20 to the armature of switch 56. Output terminal 23 at which output voltage $V_0$ is detected is connected to output terminal 24 of amplifier 21.

The integrating circuit 100 is connected between the output terminal 24 and the inverting input terminal 25 of amplifier 21. The integrating network 100 of FIG. 3 provides more complete control of the output voltage. Control circuit 60 (shown in block form) controls the operation of the integrating circuit 100.

Integrating circuit 100 includes PNP transistors Q1, Q2 and Q5. Each of these transistors has the collector electrode connected to output terminal 24 of amplifier 21 and the base electrode connected to the control circuit 60. The emitter electrodes of transistors Q1 and Q2 are connected via capacitors 65 and 64, respectively, to the inverting input terminal 25 of amplifier 21. The emitter electrode of transistor Q5 is connected via variable resistor 63 to terminal 25. Field effect transistors Q3 and Q4 are connected in parallel with capacitors 65 and 64, respectively. The source and drain electrodes are connected across the capacitors while the gate electrode is connected to control circuit 60.

An NPN transistor Q6 has the emitter thereof connected to a suitable source 61. Source 61 may be a suitable means for supplying substantially constant negative potential on the order of −15 volts. The collector electrode of transistor Q6 is connected via resistor 62 to the inverting input 25 of amplifier 21. The base electrode of transistor Q6 is connected to control circuit 60.

As will become apparent, transistors Q1, Q2, Q3 and Q4 along with capacitors 64 and 65 comprise the integrating component configuration, per se. Transistors Q5 and Q6 in conjunction with resistors 62 and 63 comprise a lower limit control circuit. That is, in accordance with the operation of control circuit 60, the lower limit circuit may be energized wherein a lower limit pedestal or offset voltage is applied to the integrating circuit components.

A comparator 75 has one input connected to terminal 24 in order to receive output voltage $V_0$. A reference voltage source 76 is connected to another input of comparator 75. The output of comparator 75 is connected to control circuit 60 to provide a control signal thereto when the voltage $V_0$ bears a predetermined relation to the reference voltage. For example, when $V_0$ exceeds $V_{REF}$, an output signal may be produced by the comparator.

Figure 4:
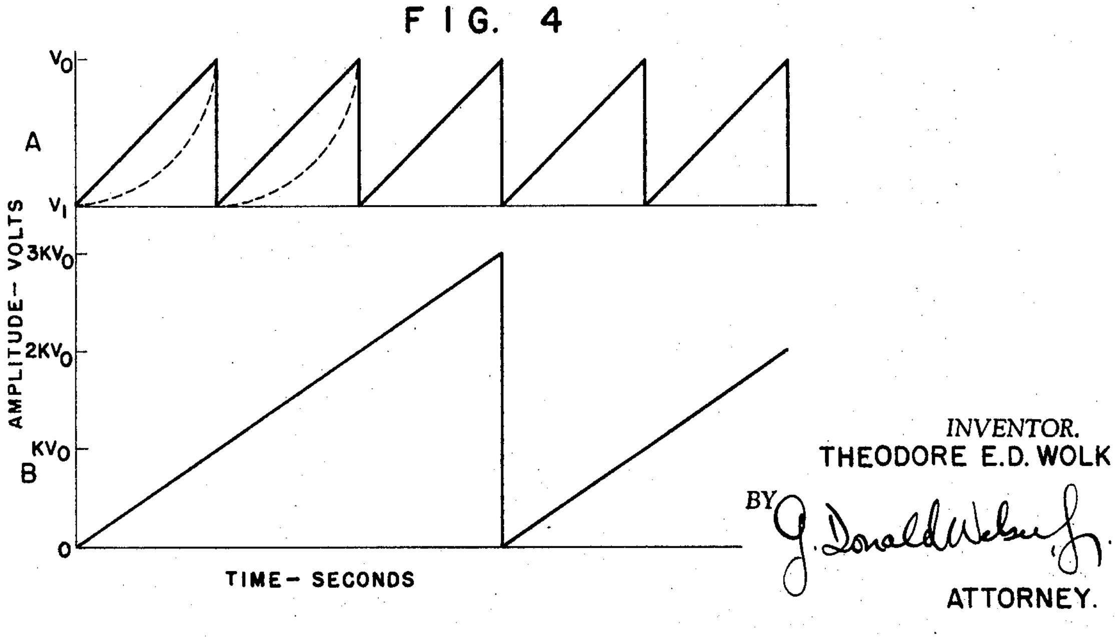
FIG. 4 is a graphic showing of the operation of the circuit embodiment shown in FIG. 3.

In operation, FIGS. 3 and 4 are considered concurrently. Transistors Q2 and Q3 are initially open and nonconductive, while transistors Q1, Q4, Q5 and Q6 are saturated and fully conductive. Thus, capacitor 64 is effectively removed from the circuit while capacitor 65 is connected in the feedback path. Under these circumstances, it is seen that the output signal $V_0$ is equal to $$V_1+\left(\frac{R63}{R62}\right)15$$

That is, the lower limit circuit includes the −15 volt source 61. Resistors 63 and 62 form a divider network, the center tap of which is connected to the inverting terminal 25 of amplifier 21. Capacitor 65 charges to a voltage level that is determined by the ratio of resistors 63 and 62. The output signal is the so-called "lower limit value." Typically, capacitor 65 is charged to this voltage level in about 300 to 400 milliseconds when capacitor 65 charges when resistor 63 is at full value. It is clear that resistor 63 can be varied until it becomes a short circuit. In this case, the offset voltage added to the input voltage $V_1$ is zero whereby $V_0=V_1$.

Since transistors Q2 and Q3 are initially nonconductive, current flow through capacitor 64 is not permitted while capacitor 65 is charged. More specifically, transistors Q1 and Q4 are fully conductive and provide a short circuit in series with capacitor 65 and across capacitor 64, respectively. Consequently, any charge that may have previously been stored on capacitor 64 is drained therefrom while capacitor 65 is charged via transistor Q1. This operation represents the quiescent condition of the circuit.

When the circuit operation is commenced, as for example by operating a start button or the like that may be included in control circuit 60, transistors Q5 and Q6 are affected. That is, after a suitable time period for example, several hundred milliseconds, control circuit 60 produces signals that render transistors Q5 and Q6 open or nonconductive. Typically, a one-shot multivibrator or similar circuit may be included in the control circuit 60, which one-shot is toggled by the initiation or start signal to produce the signals for controlling transistors Q5 and Q6. With transistors Q5 and Q6 inoperative along with transistors Q2 and Q3, the integrator operates with a time constant (T) which is determined by resistors 57 and 58 (R) and capacitor 65 (C). The RC time constant for the circuit may be varied by variation of resistor 57.

As the circuit operates, the output signal $V_0$ is a ramp signal, the amplitude of which (in this embodiment) continues to increase either linearly or logarithmically according to the condition of switches 55 and 56. FIG. 2 depicts the "single cycle" output signal produced by the circuit. The output signal is applied to output terminal 23 and to one input of comparator 75. Comparator 75 compares the signal $V_0$ against the reference voltage $V_{REF}$. When the output signal $V_0$ equals the reference voltage, comparator 75 produces a signal that is applied to control circuit 60.

The signal supplied to control circuit 60 from comparator 75 is operative to produce switching signals. These signals are applied to the transistors such that transistor Q1 through Q4 change states. Thus, transistor Q1 becomes nonconductive breaking the current path with capacitor 65. In addition, transistor Q3 becomes conductive, thereby shorting capacitor 65 and draining the residual charge therefrom. This condition is represented by the vertical line portion of signal A in FIG. 4. Similarly, transistor Q2 is rendered conductive to provide a circuit path, with capacitor 64, across amplifier 21. Also, transistor Q4 is rendered nonconductive thereby removing the short circuit across capacitor 64 so that charge may be stored therein. Transistors Q5 and Q6 remain turned off as noted supra. Capacitor 64 is now the integrating capacitor across amplifier 21 while capacitor 65 is being discharged. In a preferred embodiment, capacitors 64 and 65 are identical in parameters. Thus, the integrating rate and the time constant for the system is the same regardless of which integrating path is utilized. In some applications, it is conceivable that different charging rates may be desired wherein the capacitors may have different values.

With capacitor 64 and transistor Q2 operative, amplifier 21 operates as an integrator. The output signal $V_0$ is a ramp signal which varies linearly or logarithmically according to the position of switches 55 and 56. The signal is supplied to the output terminal 23 as well as to comparator 75. Again, when the signal $V_0$ applied to comparator 75 is equal to the reference signal applied at source 76, comparator 75 provides a control signal which is supplied to control circuit 60. This control signal again switches the operation of transistors Q1 through Q4 whereby the integrating path now includes capacitor 65 while capacitor 64 is discharged through transistor Q4. The output signal produced by the circuit is shown as signal A in FIG. 4.

The advantage of the range-changing circuitry comprising control circuit 60 and the selective insertion of capacitors 64 and 65 into the circuit is that high-speed switching can be effected. Thus, if the range of operation of the amplifier and integrator circuit is relatively large as, for example, where the output signal has a large variation, it is frequently desirable to provide the amplification in stages. This is especially true where the input signal supplied to the circuit is a relatively small signal compared to the output signal desired. In a suitable application of this circuit, an output signal of 10.0 volts may be required in response to an input signal of a particular level, for example 0.1 volt. As the output signal increases (linearly or logarithmically) as a ramp waveform, the operation of the circuit may be enhanced by limiting the excursion of the output signal. Consequently, the comparator circuit switches the integrating path for the circuit when a predetermined level, e.g. $V_0$, is achieved. Thus, as shown by signal A, amplifier 21 operates in a predetermined de-The shorting transistors or FET's are useful to provide a quick discharge path for the capacitor which is not in use such that residual charge is drained therefrom and the unused capacitor is ready for further, subsequent operation. This quick discharge is represented by the vertical line portion of signal A. Of course, the output of the ramp circuit varies between $V_1$ and $V_0$. In order to obtain the large amplitude signal B, shown in FIG. 4, additional circuitry (not shown may be useful). For example, a suitable circuit for additively providing an offset voltage to the ramp signal will raise the individual output signals.

It should be understood that the operation of the circuit shown in FIG. 3 is similar to the operation of the circuit shown in FIG. 1 regarding the log/linear mode of operation. The circuit in FIG. 3, however, provides control of the integrating capacitors, lower limit value and the upper limit value as defined by the reference voltage at comparator 75.

Thus, it is obvious that the subject invention provides a signal generator that produces a ramp output signal. The ramp output signal can be varied to operate as a log or a linear ramp function and can have the amplification rate controlled selectively. The transition from log to linear, as well as the range-changing operation, is achieved with a minimum number of parts and with extreme simplicity. It is possible that modifications may be suggested to those skilled in the art. However, those changes which fall within the purview of the inventive concepts described herein are intended to be included within the scope of the invention.

The embodiments of the invention in which an exclusive property or privilege is claimed are defined as follows:

1. A signal generator comprising:
amplifier means;
energy storage means connected in parallel with said amplifier means;
input means for selectively supplying input signals to said amplifier means;

first switch means having a first and second switching condition for selectively connecting selected input signals to said amplifier means;

feedback means selectively connected in parallel with said amplifier means; and second switch means having a first and second switching condition for effecting the selective connection of said feedback means;

said first and second switch means being arranged for simultaneous operation between said first and second conditions;

said amplifier means being characterized by a linear output when said switch means are in said first condition and by a log function output when said switch means are in said second condition.

2. The signal generator recited in claim 1 wherein, said amplifier means includes first and second inputs, said energy storage means connected between the output of said amplifier means and said first input, said first and second switch means connected to said first and second inputs, respectively, said feedback means being connected from said output of said amplifier means to said second switch means for selective connection to said second input thereof.

3. The signal generator recited in claim 2 wherein, said input means includes a plurality of signal source means, first of said signal source means being connected to said second input, and second and third of said source means being connected to said first input via said first switch means.

4. The signal generator recited in claim 1 wherein, said energy storage means comprises a plurality of capacitors connected in parallel with said amplifier means, separate switch means connected to each of said capacitors to control the charge storing capability thereof, and means for alternately controlling said separate switch means.

5. The signal generator recited in claim 4 including comparator means connected to the output of said amplifier means, reference means connected to said comparator means to be compared with the signal at the output of said amplifier means, said means for controlling said separate switch means being connected to said comparator means to receive signals therefrom indicative of the comparator means operation.

6. The signal generator of claim 4 wherein each of said separate switch means includes a pair of semiconductor devices, one of said semiconductor devices of said pair of semiconductor devices being connected in series with an associated one of said plurality of capacitors to control current flow thereto, the other of said semiconductor devices of said pair of semiconductor devices being connected in parallel with said associated capacitor to selectively short circuit same and thereby control charge storage therein, said pair of semiconductor devices in each of said separate switch means being substantially instantaneously switchable to exhibit opposite conductivity states.

7. The signal generator recited in claim 1 wherein, said input means comprises voltage divider means, said voltage divider means providing a plurality of potential levels that are applicable to said amplifier means.

References Cited

UNITED STATES PATENTS

| | | | |
|---|---|---|---|
| 3,210,558 | 10/1965 | Owen | 307—229 XR |
| 3,221,186 | 11/1965 | MacDonald et al. | 307—229 |
| 3,284,716 | 11/1966 | Chopin | 307—235 XR |
| 3,369,128 | 2/1968 | Pearlman | 307—229 |
| 3,371,223 | 2/1968 | Gilbert | 328—127 XR |
| 3,422,372 | 1/1969 | Post et al. | 307—228 XR |

DONALD D. FORRER, Primary Examiner

J. ZAZWORSKY, Assistant Examiner

U.S. Cl. X.R.

307—228; 328—127, 145, 185